(12) United States Patent
Brenner et al.

(10) Patent No.: US 10,794,678 B2
(45) Date of Patent: Oct. 6, 2020

(54) APPARATUS FOR MEASURING THE ROUGHNESS OF A WORKPIECE SURFACE

(71) Applicant: Carl Zeiss Industrielle Messtechnik GmbH, Oberkochen (DE)

(72) Inventors: Kurt Brenner, Satteldorf (DE); Philipp Mayinger, Aalen (DE); Walter Jenisch, Heidenheim (DE); Anton Fuchs, Boehmenkirch (DE); Kai Bartel, Lorch (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 148 days.

(21) Appl. No.: 15/904,520

(22) Filed: Feb. 26, 2018

(65) Prior Publication Data
US 2018/0245905 A1 Aug. 30, 2018

(30) Foreign Application Priority Data
Feb. 24, 2017 (DE) .................. 10 2017 103 938

(51) Int. Cl.
*G01B 5/28* (2006.01)
*G01B 5/012* (2006.01)
(Continued)

(52) U.S. Cl.
CPC .............. *G01B 5/28* (2013.01); *B82Y 15/00* (2013.01); *B82Y 35/00* (2013.01); *G01B 5/012* (2013.01);
(Continued)

(58) Field of Classification Search
CPC ........ B82Y 35/00; B82Y 15/00; G01Q 60/38; G01Q 10/06; G01B 7/34
(Continued)

(56) References Cited

U.S. PATENT DOCUMENTS

| 4,068,156 A | * | 1/1978 | Johnson ................. B25J 9/1692 318/575 |
| 4,435,905 A | * | 3/1984 | Bryan ..................... G01B 7/02 33/613 |

(Continued)

FOREIGN PATENT DOCUMENTS

| DE | 10131038 A1 | * | 1/2003 | .......... G01B 11/007 |
| DE | 10131038 A1 | | 1/2003 | |

(Continued)

OTHER PUBLICATIONS

Office Action issued in German Patent Application No. DE 10 2017 103 938.4, dated Feb. 3, 2020 (from which this application claims priority) and English language translation thereof.

*Primary Examiner* — Clayton E. LaBalle
*Assistant Examiner* — Kevin C Butler
(74) *Attorney, Agent, or Firm* — Falk Ewers; Ewers IP Law PLLC

(57) ABSTRACT

An apparatus for measuring a surface of a workpiece has a multi-link articulated arm and a roughness sensor carried by the arm, which includes a sensing element linearly displaceable along an advance direction and elastically deflectable along a deflection direction, and which has a coupling link to connect it to a movable carrier of a coordinate measuring apparatus or of a robot. A first arm portion is rotatable relative to the coupling link about a first axis of rotation. A second arm portion is rotatable relative to the first arm portion about a second axis of rotation and arranged between the first and third arm portion which is rotatable relative to the second arm portion about a third axis of rotation, and to which the roughness sensor is fastened. The deflection direction is arranged parallel to the third axis while the sensing element is displaced linearly along the advance direction.

3 Claims, 3 Drawing Sheets

(51) Int. Cl.
*G01B 7/34* (2006.01)
*G01Q 10/06* (2010.01)
*G01Q 60/38* (2010.01)
*B82Y 15/00* (2011.01)
*B82Y 35/00* (2011.01)

(52) U.S. Cl.
CPC .............. *G01B 7/34* (2013.01); *G01Q 10/06* (2013.01); *G01Q 60/38* (2013.01)

(58) Field of Classification Search
USPC .......................................................... 73/105
See application file for complete search history.

(56) References Cited

U.S. PATENT DOCUMENTS

| | | | | | |
|---|---|---|---|---|---|
| 4,492,036 | A | * | 1/1985 | Beckwith, Jr. | G01B 3/30 33/503 |
| 4,753,569 | A | * | 6/1988 | Pryor | A01B 69/008 250/201.1 |
| 4,806,066 | A | * | 2/1989 | Rhodes | B25J 9/046 254/286 |
| 4,853,863 | A | * | 8/1989 | Cohen | G01S 5/0247 701/300 |
| 4,888,877 | A | * | 12/1989 | Enderle | G01B 5/012 33/559 |
| 4,892,457 | A | * | 1/1990 | Bartlett | B25J 9/1692 414/735 |
| 4,991,304 | A | * | 2/1991 | McMurtry | G01B 7/008 33/1 M |
| 5,259,120 | A | * | 11/1993 | Chapman | G01B 21/042 33/502 |
| 5,400,638 | A | * | 3/1995 | Kim | B25J 9/1692 73/1.79 |
| 5,501,096 | A | * | 3/1996 | Stettner | G01B 21/042 33/503 |
| 5,528,116 | A | * | 6/1996 | Snell | B25J 9/1692 318/568.13 |
| 6,357,286 | B1 | * | 3/2002 | Kanematsu | B82Y 15/00 73/105 |
| 6,412,329 | B1 | * | 7/2002 | Nai | G05B 19/19 702/95 |
| 6,484,571 | B1 | * | 11/2002 | Hidaka | G01B 5/012 33/503 |
| 6,510,363 | B1 | * | 1/2003 | Hidaka | G01B 21/30 700/187 |
| 6,758,085 | B2 | * | 7/2004 | Nagaike | G01B 3/008 33/503 |
| 7,162,383 | B2 | * | 1/2007 | Takemura | G01B 5/28 702/95 |
| 7,347,084 | B2 | * | 3/2008 | Tolzer | G01B 5/28 73/104 |
| 7,392,692 | B2 | * | 7/2008 | Noda | G01B 5/008 33/503 |
| 8,006,399 | B2 | * | 8/2011 | Wallace | G01B 7/012 33/503 |
| 2006/0191328 | A1 | * | 8/2006 | Katayama | G01B 21/042 73/105 |
| 2007/0028677 | A1 | * | 2/2007 | McFarland | G01B 21/045 73/105 |
| 2008/0236260 | A1 | * | 10/2008 | Noda | G01B 5/008 73/105 |
| 2008/0257023 | A1 | * | 10/2008 | Jordil | G01B 21/045 73/105 |
| 2009/0025464 | A1 | * | 1/2009 | Ishii | G01B 5/20 73/105 |
| 2012/0017454 | A1 | * | 1/2012 | Ferrari | G01B 21/047 33/503 |
| 2013/0239668 | A1 | * | 9/2013 | Honda | G01B 21/047 73/105 |
| 2015/0046558 | A1 | | 2/2015 | Padgett | |
| 2016/0138911 | A1 | * | 5/2016 | Wallace | G01B 21/042 73/1.79 |

FOREIGN PATENT DOCUMENTS

| | | | | |
|---|---|---|---|---|
| DE | 102009019129 A1 | * | 11/2010 | ............. B25J 9/06 |
| DE | 102009019129 A1 | | 11/2010 | |
| DE | 102011000862 A1 | * | 3/2012 | ......... B25J 19/0029 |
| DE | 102011000862 A1 | | 3/2012 | |
| DE | 202014101900 U1 | | 12/2014 | |
| DE | 202014010900 U1 | | 2/2017 | |
| EP | 2207006 A2 | | 7/2010 | |
| WO | WO1997018436 | * | 5/1997 | ............... G01B 5/03 |

* cited by examiner

APPARATUS FOR MEASURING THE ROUGHNESS OF A WORKPIECE SURFACE

CROSS REFERENCE TO RELATED APPLICATIONS

This application claims priority to German patent application DE 10 2017 103 938.4, filed Feb. 24, 2017, the entire content of which is incorporated herein by reference.

TECHNICAL FIELD

The invention relates to an apparatus for measuring the roughness of a workpiece surface. The apparatus includes a multi-link articulated arm that can be fastened to a movable carrier of a coordinate measuring machine and a roughness sensor carried by the arm.

BACKGROUND

For the purpose of measuring the roughness of workpiece surfaces, use is made of roughness sensors which are often fastened to coordinate measuring machines (CMMs). Such coordinate measuring machines usually include a table carrying the workpiece to be measured and a positioning device allowing the roughness sensor to be displaced with high accuracy in three orthogonal displacement directions x, y, and z relative to the table. However, coordinate measuring machines having a displaceable table that moves relative to the stationary measurement apparatus are also known.

Further, coordinate measuring machines have an evaluation and control device which controls the movements of the positioning device and evaluates the measurement values supplied by the roughness sensor.

The roughness sensor is usually a so-called stylus instrument. It has a movably mounted measuring arm with a sensing element, e.g., a diamond needle, which is deflected during the measurement by the contact with the workpiece surface being fastened to the end of the measuring arm. The sensing element is displaced along an advance direction, perpendicular to the deflection direction of the sensing element, with the aid of a linear drive and it is thus guided over the workpiece surface to be measured.

In recent years, the field of application of such measuring apparatuses has increasingly expanded. Workpieces often have to be manufactured with so small tolerances in modern production processes and continuous process monitoring is indispensable. This, in turn, necessitates a far-reaching automation of the measurements.

Moreover, a problem arising ever more frequently is that the workpieces whose surfaces are intended to be measured in an automated fashion have very complex forms. By way of example, an engine block of an internal combustion engine has a multiplicity of bores with different internal diameters, several undercuts, and irregular recesses on which there are surfaces to be measured. Conventional coordinate measuring machines with their usually very high-volume positioning devices are often unable to position a stylus instrument or another sensor into the openings or recesses of an engine block in such a way that a roughness measurement can be performed.

As a result, modern measuring apparatuses for coordinate measuring machines occasionally have a movable arm with a comparatively thin construction, said arm carrying the roughness sensor. The arm has a plurality of rotational degrees of freedom and can consequently put the roughness sensor in practically any desired position relative to the workpiece with the aid of suitable drives.

U.S. Pat. No. 8,006,399 describes an arm having two orthogonal axes of rotation. Moreover, the measuring arm of the roughness sensor fastened to the arm is still rotatable about its longitudinal axis such that, overall, three rotational degrees of freedom are available for ideal positioning of the measuring arm.

An arm having three axes of rotation is known from DE 20 2014 101 900 U1. The roughness measuring arm which includes the roughness probe and the linear drive for the advance thereof is connected to the arm by way of a coupling such that it can easily be replaced by a different roughness measuring arm. In this known measuring apparatus, the deflection direction of the sensing element extends perpendicular to the third axis of rotation during the linear advance.

In addition, such measuring apparatuses are fastened not only to the positioning devices of coordinate measuring machines but also to the movable arms of precision robots.

SUMMARY

It is an object of the present invention to improve the measurement accuracy of measuring apparatuses for measuring a surface of a workpiece, the measuring apparatuses including a multi-link articulated arm and a roughness sensor carried by the arm.

According to an aspect of the invention, this object is achieved by providing an apparatus for measuring a surface of a workpiece, the measuring apparatus including a multi-link articulated arm and a roughness sensor carried by the arm. The roughness sensor has a sensing element that is linearly displaceable along an advance direction and elastically deflectable along a deflection direction. The arm has a coupling link configured to connect the arm to a movable carrier of a coordinate measuring machine or of a robot. Further, the arm includes a first arm portion which is arranged relative to the coupling link in a manner rotatable about a first axis of rotation by a first drive and is typically arranged below the coupling link. A second arm portion is rotatable relative to the first arm portion about a second axis of rotation by a second drive. Moreover, the arm has a third arm portion which is rotatable relative to the second arm portion about a third axis of rotation by a third drive. The roughness sensor is fastened to the third arm portion. The second arm portion is arranged between the first arm portion and the third arm portion. According to an aspect of the invention, the deflection direction is arranged parallel to the third axis of rotation, to be precise permanently and, hence, also while the sensing element is displaced linearly along the advance direction.

The invention is based on the discovery that relatively large forces parallel to the deflection direction act on the arm of the measuring apparatus, particularly at the moment of contact, i.e., when the roughness sensor is displaced in the direction of the surface of the workpiece at the beginning of a measurement process and contacts the surface for the first time. However, since the deflection direction is arranged in parallel to the third axis of rotation according to an aspect of the invention, these forces cannot lead to a rotation of the third arm portion relative to the second arm portion, because such an axially parallel force does not exert a torque. At best, a torque can be exerted on the second arm portion or the first arm portion. However, as a rule, these arm portions have a substantially more solid embodiment than the third arm portion, which is located in the direct vicinity of the workpiece. This is because, as a rule, the dimensions of the arm portions become smaller, the closer they are to the sensing element. Only if the third arm portion has small dimensions, the third arm portion is able to guide the roughness sensor into narrow and angled regions of a workpiece and to position the sensing element there in a suitable manner over the surface to be measured.

Consequently, because of the arrangement of the deflection direction parallel to the third axis of rotation according to an aspect of the invention, there cannot be an unwanted rotation about the third axis of rotation, especially when contacting a surface. As a result, the sensing element remains ideally positioned in the desired pose relative to the workpiece, as a result of which the measurement accuracy is increased. Moreover, as a consequence of the increased rigidity in respect of the third axis of rotation, there is a reduced susceptibility to vibrations, which may emanate, for example, from the floor carrying the coordinate measuring machine or the robot.

Naturally, a corresponding statement also applies to the actual measurement process, during which the sensing element is guided along the advance direction and over the workpiece with a predefined minimum pressure. However, the forces along the deflection direction acting on the roughness sensor in the process are significantly smaller than the forces acting at the instant of contact.

It is advantageous if at least one drive of the arm is embodied as a brushless DC motor. These motors have a high torque and a low power consumption and have good electromagnetic compatibility.

Moreover, it is expedient if flexible printed circuits are used for transferring measurement, closed-loop control, and/or open-loop control signals between the links of the arm. The flexible printed circuits carrying electronic components are very flexible and, as a result thereof, do not restrict the angles of rotation in respect of the axes of rotation. In order to ensure angles of rotation of up to 360°, the flexible printed circuits may be wound onto cable coilers. The maximum angle of rotation can be flexibly set by way of the number of windings. Consequently, there are no sliding contacts or other interfaces which are problematic in the case of a transfer of analog signals, which can wear and which, moreover, are disadvantageous in view of electrostatic discharge (ESD).

For electromagnetic shielding purposes, the flexible printed circuits may be provided with a metal layer on one side.

However, optical waveguides may also be used to transfer the measurement signals instead of the flexible printed circuits.

BRIEF DESCRIPTION OF THE DRAWINGS

The invention will now be described with reference to the drawings wherein.

DESCRIPTION OF EXEMPLARY EMBODIMENTS

1. Coordinate Measuring Machine

Figure 1:
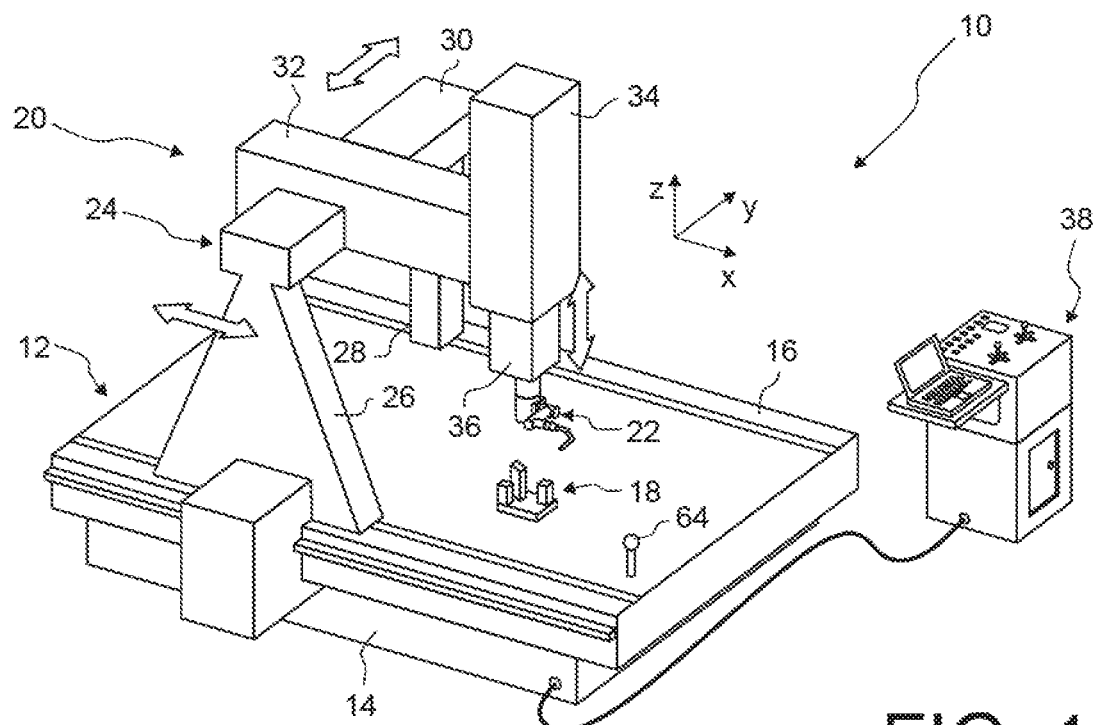
FIG. 1 shows a perspective illustration of a coordinate measuring machine with a measuring apparatus fastened thereto according to an exemplary embodiment of the invention.

FIG. 1 shows a perspective illustration of a coordinate measuring machine 10. The coordinate measuring machine 10 includes a table 12 having a base 14 and a plate 16 made of hard rock. The plate 16 serves to receive a workpiece 18, the surface of which is intended to be measured. In the illustrated exemplary embodiment, the measurement is a spatially resolved roughness measurement.

The table 12 carries a positioning device 20, by which a measuring apparatus 22 according to an exemplary embodiment of the invention can be positioned relative to the table 12 with high accuracy. In the illustrated exemplary embodiment, the positioning device 20 has a portal-type configuration and includes a portal 24 that is mounted at the edges of the table 12 with two feet 26, 28 and is displaceable along the table 12 in the horizontally extending x-direction in a motor-driven manner. A cantilever 32 is mounted on a portal crossbeam 30, which interconnects the two feet 26, 28, in such a way that the cantilever can be displaced in a motor-driven manner along the longitudinal direction of the portal crossbeam 30, i.e., in the likewise horizontally extending y-direction, as indicated by a double-headed arrow. A measurement carrier 36 is received in a vertically aligned receptacle 34 of the cantilever 32 and displaceable in a motor-driven manner along the vertically extending z-direction.

With the an automatic coupling, the measuring apparatus 22 according to an exemplary embodiment of the invention is fastened to the measurement carrier 36 in such a way that it can be automatically replaced by measuring apparatuses with different constructions. To this end, the positioning device 20 usually deposits the measuring apparatus 22 in a holder (not shown) at the edge of the table 12 and then approaches another measuring apparatus, held in the holder, in such a way that the automatic coupling is activated. To this end, the coupling includes a three-point bearing and an electromagnet, which is automatically switched on after recognizing an ID chip attached to a coupling plate of the measuring apparatus 22. In addition to a mechanical connection, the automatic coupling can also establish a communication link so that control and measurement data can be interchanged between the measuring apparatus 22 and the control and evaluation device 38. However, as an alternative thereto, this communication may also be effectuated by a radio interface.

The space that can be reached by the measurement carrier 36 as a result of displacement movements along the x-, y-, and z-axis is of the order of approximately 1 m$^3$ in the illustrated exemplary embodiment, and so even significantly larger workpieces 18 can be measured than what is illustrated in FIG. 1.

For each of the three displacement directions x, y, and z, the positioning device 20 has at least one transducer which returns information about the traveling distance covered to an evaluation and control device 38. As a result, the position of the automatic coupling, which has the measuring apparatus 22 fastened thereto and which substantially corresponds to the tool center point (TCP) in the case of robots, is known with high accuracy in all displacement positions.

The evaluation and control device 38 controls the movements of the positioning device 20 and evaluates the measurement values transferred from the measuring apparatus 22. The evaluation also includes the computational correction of the measurement values supplied by the measuring apparatus 22. As a result, it is possible to take account of static and dynamic influences of the positioning device 20, thermal deformations of the table 12, and also the bend of tactile probes caused by the contact forces.

Figure 2:
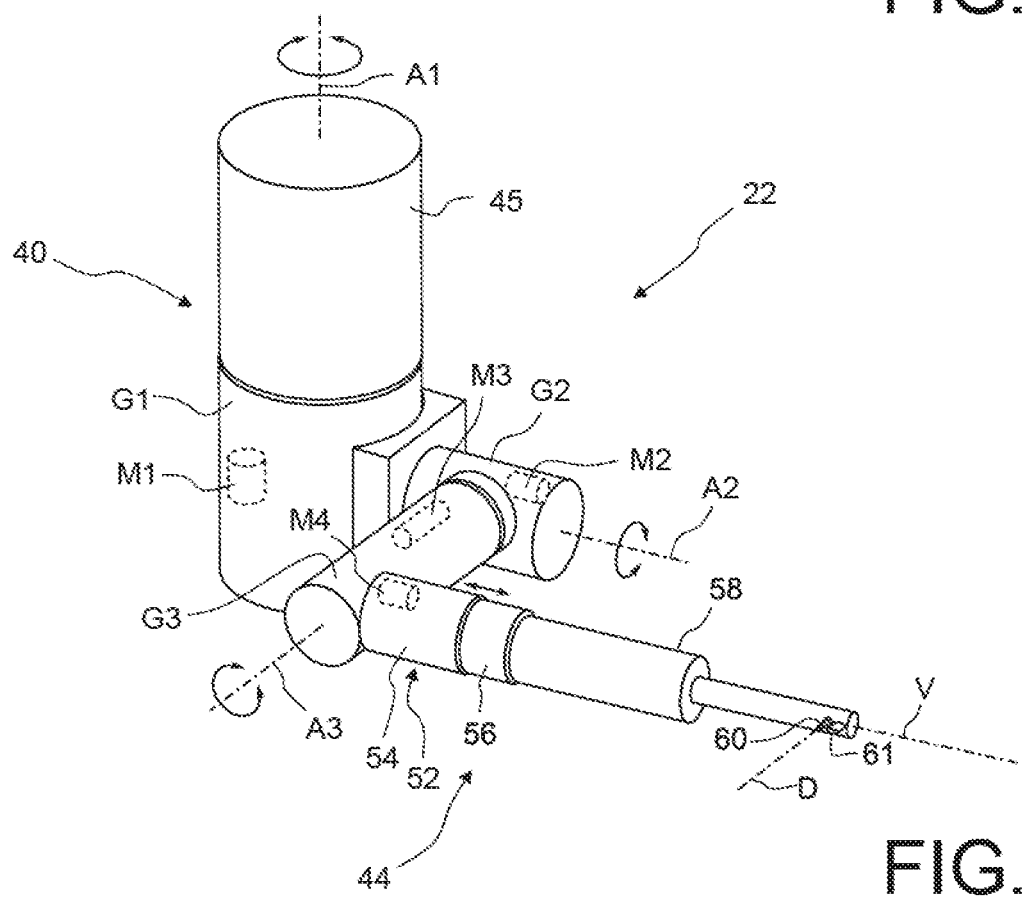
FIG. 2 shows a magnified illustration of the measuring apparatus shown in FIG. 1.

The structure of the measuring apparatus 22 according to an exemplary embodiment of the invention is explained in more detail below with reference to FIG. 2.

2. Design of the Measuring Apparatus

The measuring apparatus 22 comprises an arm 40 having a plurality of movably interconnected links and a roughness sensor 44 fastened to one end of the arm 40. The link of the arm 40 illustrated at the top in FIG. 2 is also referred to as coupling link 45 below and it is provided to connect the arm 40 to the corresponding counter piece of the automatic coupling at the measurement carrier 36 of the portal 24.

The arm 40 has a first arm portion G1, which is arranged below the coupling link 45. The first arm portion G1 is rotatable relative to the coupling link 45 about a first axis of rotation A1 and it includes a first drive to this end, the first drive only being indicated schematically in FIG. 2 and being denoted by M1. A second arm portion G2 is rotatable relative to the first arm portion G1 about a second axis of rotation A2 with the aid of a second drive M2, with the second axis of rotation A2 extending perpendicular to the first axis of rotation A1. A third arm portion G3 is rotatable relative to the second arm portion G2 with the aid of a third drive M3, to be precise about a third axis of rotation A3 which extends perpendicular to the second axis of rotation A2. Here, the arm 40 is designed such that the second axis of rotation A2 intersects both the first axis of rotation A1 and the second axis of rotation A3.

Thin flexible printed circuits (FPCs), which carry electronic components, and which are very flexible, are typically used to transfer the measurement, closed-loop control, and open-loop control signals between the links of the arm 40 that are movable relative to one another. Firstly, the FPCs only require little installation space as a result thereof. Secondly, they do not restrict the angles of rotation in relation to the axes A1, A2, and A3. For electromagnetic shielding purposes, the flexible printed circuits may be provided with at least one metal layer on one side.

The roughness sensor 44 is fastened to the third arm portion G3. It includes an advance unit 52 extending radially to the outside from the third arm portion G3, the advance unit including a drive unit 54 and a fastening element 56. The fastening element 56 is linearly displaceable relative to the drive unit 54 along an advance direction V with the aid of a drive M4, as indicated by a double-headed arrow. Here, the advance direction V extends perpendicular to the third axis of rotation A3 and it is co-rotated with the latter.

A roughness probe 58 embodied as a stylus instrument is fastened to the fastening element 56, the roughness probe having a substantially tube-shaped housing 59 with a stepped diameter in the illustrated exemplary embodiment. At the free end of the roughness probe, a tactile sensing element 60 protrudes out of an opening in the housing 59, the tactile sensing element being fastened at the end of a rotatably mounted or bendable measuring arm and possibly being a diamond needle, for example. The roughness probe 58 captures deflections of the sensing element 60 along a deflection direction D. The roughness probe 58 is fastened to the fastening element 56 of the advance unit 52 in such a way that the deflection direction D is arranged parallel to the third axis of rotation A3.

A skid 61 is located directly next to the sensing element 60, which, in contrast to the sensing element, is not deflectable but instead securely connected to the housing 59 of the roughness probe 58, and which also carries out the advance movement of the latter. During the measurements, the skid 61 rests against the workpiece and prevents the roughness probe 58 from vibrating during the measurements. As a result, deflections of the sensing element 60 along the deflection direction D correspond to path differences to the distal end of the skid 61, as is known per se from the related art.

The motors M1, M2, M3 and M4 are typically DC motors, which may also be brushless (brushless DC motor, BLDC) and which may be equipped with a gearing, or stepper motors which may be embodied as reluctance, permanent magnet or Lavet-type stepper motors with an increment that is as small as possible, ideally <0.1°. As a result of using a plurality of potentiometers in each axis, the angular range assigned to each axis may also be greater than 360°.

Figure 3:
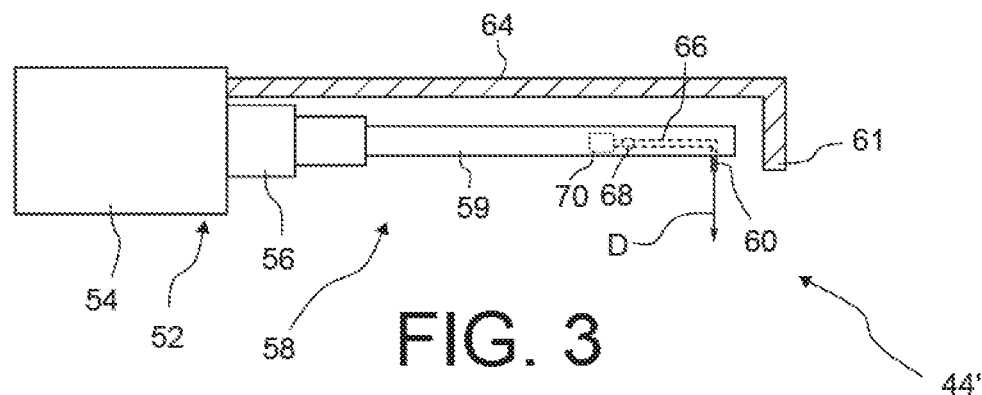
FIG. 3 shows a roughness sensor which is part of the measuring apparatus according to another exemplary embodiment of the invention.

In a partly cut side view, FIG. 3 shows another roughness sensor that is suitable for the measuring apparatus 22 and denoted by 44'. In the roughness sensor 44', the skid 61 is not fastened to the movable housing 59 but formed at the end of a bracket 64 that is fastened to the drive unit 54 of the advance unit 52. Therefore, the skid 61 does not move during the advance of the roughness probe 58 along the advance direction V. When contacting a surface, the contact forces along the deflection direction D therefore do not act primarily on the roughness probe 58 but on the bracket 64.

It is moreover clear from FIG. 3 that the sensing element 60 in the illustrated exemplary embodiment is fastened to the end of an angled measuring arm 66 which is rotatable about a rotary shaft 68. The rotation of the measuring arm is captured by a measurement system 70. Based on the signal produced by the measurement system 70, the deflection of the sensing element 60 along the deflection direction D is calculated.

Figure 4:
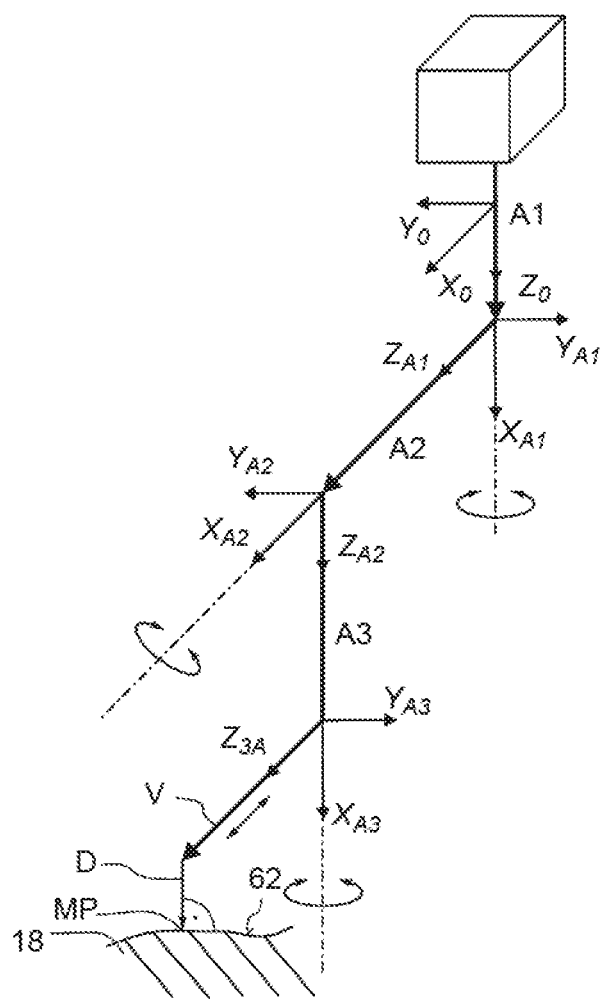
FIG. 4 shows a model of the measuring apparatus shown in FIGS. 1 and 2 in one configuration of the measurement arm.

The relative arrangement of the aforementioned axes of rotation A1, A2, A3; the advance direction V; and the deflection direction D are illustrated in FIG. 4 without the portions G1, G2, and G3 of the arm 40. Additionally, a plurality of coordinate systems is plotted in this model-like illustration. A coordinate system having the coordinate axes X0, Y0 and Z0 is assigned to the coupling link 45 which is rigidly coupled to the measurement carrier 34 of the positioning device 20. Further coordinate systems are plotted for the arm portions G1, G2, G3. Here, the first arm portion G1 has the coordinate system with the coordinate axes $X_{A1}$, $Y_{A1}$ and $Z_{A1}$, the coordinate system rotating about the first axis of rotation A1 in respect of the coordinate system $X_0$, $Y_0$, and $Z_0$ when the drive M1 is actuated accordingly. Therefore, the coordinate system with the coordinate axes $X_{A2}$, $Y_{A2}$, and $Z_{A2}$ assigned to the second arm portion G2 rotates with the second axis of rotation A2 and the coordinate system with the coordinate axes $X_{A3}$, $Y_{A3}$, and $Z_{A3}$ assigned to the third arm portion G3 rotates with the third axis of rotation A3. The advance unit 52 only has a linear degree of freedom along the advance direction V. As already mentioned above, the advance direction V rotates about the third axis of rotation A3 in the case of a rotation of the third arm portion G3. The deflection direction D extends perpendicular to the advance direction V and parallel to the third axis of rotation A3. The arm 40 must be actuated by the control and evaluation device 38 in such a way that the deflection direction D is always at least substantially perpendicular to a surface 62 to be measured of the workpiece 18.

3. Function

The control and evaluation device 38 defines which regions of the surface 62 of the workpiece 18 should be sensed by the roughness sensor 44, 44'. Then, based on known algorithms, the evaluation and control device 38 calculates how the positioning device 20 of the coordinate measuring machine 10 and the motors M1 to M3 of the measuring apparatus 22 have to be actuated so that the roughness sensor 44, 44' can be brought to the surface 62 in such a way that a roughness measurement can be carried out. If the workpiece 18 blocks the direct path to the desired final position, the algorithms must set evading paths that ensure that no part of the coordinate measuring machine 10 and of the measuring apparatus 22 fastened thereto contacts the workpiece 18. Especially if the surfaces to be measured are situated in bores or deep recesses of the workpiece 18, the position of all parts of the measuring apparatus 22 should always be exactly known so that there are no collisions which could imply a termination of the measurement process.

Since the arm 40 includes three axes of rotation, the roughness sensor 44, 44' can, in principle, be transferred into any desired position. The fact that it is not possible for every desired surface to be reached by the roughness sensor 44, 44' in the case of certain workpieces 18 is related to the above-described restrictions of the traveling distances and, naturally, also to the fact that the dimensions of the individual parts of the measuring apparatus 22 may not allow the sensing element 60 to be positioned at any desired position in relation to a workpiece 18 under certain circumstances.

Figure 5:
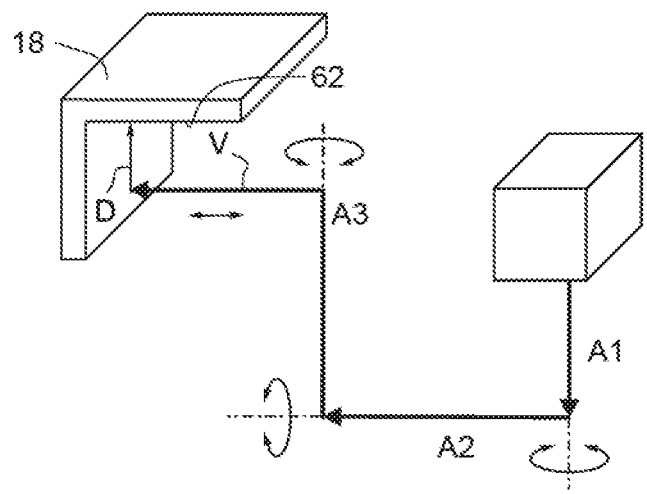
FIG. 5 shows a model of the measuring apparatus shown in FIGS. 1 and 2 in another configuration of the measurement arm.

In a model-like illustration based on FIG. 4, FIG. 5 shows the arm 40 of the measuring apparatus 22, which probes a surface 62 on an angled workpiece 18. In the illustrated position, all axes of rotation A1, A2, A3 of the arm 40 are located in a common plane.

A force extending parallel to the third axis of rotation A3 acts on the arm 44 during the contacting, i.e., when the skid 61 and the sensing element 60 of the roughness sensor 44, 44' strike the horizontal and downward-pointing surface 62 of the workpiece 18 for the first time. Since the third axis of rotation A3 extends parallel to the first axis of rotation A1 in the illustrated position, this force cannot exert any torque on any one of the three axes A1, A2, and A3. Consequently, there cannot be an unwanted repositioning of the arm 40, and hence a change in position of the roughness sensor 44, 44', during the contacting.

The advance unit 52 is actuated after the contacting, as a result of which the sensing element 60 is displaced along the displacement direction V. Then, the roughness sensor 44, 44' measures the roughness of the surface 62 along a line extending along the advance direction V. A measurement line oriented thus is expedient because the downward-pointing horizontal surface 62 of the workpiece 18 can only be processed along the z-direction by lapping or another machining operation. Therefore, the measuring direction should be aligned as close to perpendicular as possible to the processing direction and consequently parallel to the Y-direction.

Figure 6:
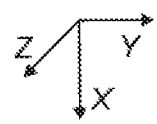
FIG. 6 shows a model of the measuring apparatus shown in FIGS. 1 and 2 in a further configuration of the measurement arm.
Figure 6:
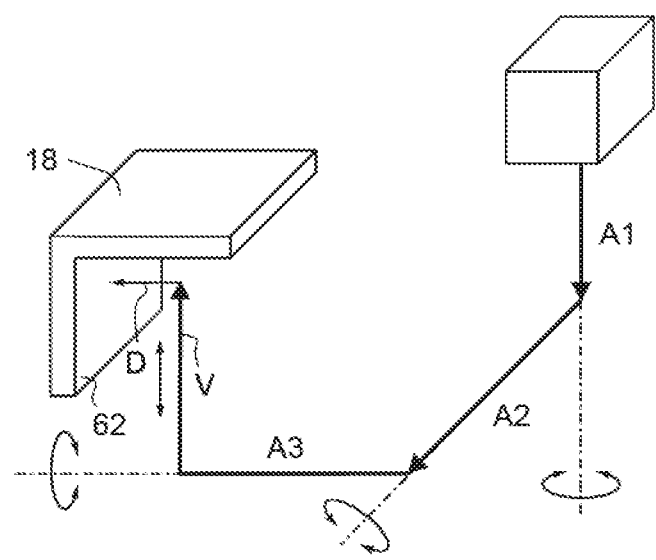

In the position of the arm 40 shown in FIG. 6, the right-pointing and vertically aligned surface 62 of the workpiece 18 is measured with the aid of the roughness sensor 44, 44'. Here too, the advance direction V extends perpendicular to the processing direction of the surface 62 and hence in the x-direction.

The arm 40 is angled such that none of the axes of rotation A1, A2, and A3 are parallel to another axis of rotation. If a force is exerted on the arm 40 along the deflection direction D during contacting, this only produces a torque in respect to the first axis of rotation A1. As can be seen in FIG. 2, this rotary joint is formed by the coupling link 45 and the first link G1. These are comparatively solid and stably embodied assemblies which can easily absorb the torque produced during contacting, without this leading to an unwanted rotation about the first axis of rotation A1.

The links G1 and G2, which can rotate relative to one another about the second axis of rotation G2, also absorb torques produced during contacting more easily than the thinner link G3, which can rotate about the third axis of rotation A3.

However, torques about the third axis of rotation A3 can never occur during contacting since the deflection direction D is always aligned in parallel with the third axis of rotation A3, to be precise also during the advance movement along the advance direction V. To the extent that relatively large torques arise during contacting, these may, at best, act on the second or third axis of rotation A2 and A3, respectively. Since the corresponding rotary joints have a more solid embodiment, such torques do not lead to unwanted rotations, or to a lower degree of unwanted rotations, of the arm 40 than if the torque were to act on the third axis of rotation A3.

It is understood that the foregoing description is that of the exemplary embodiments of the invention and that various changes and modifications may be made thereto without departing from the spirit and scope of the invention as defined in the appended claims.

What is claimed is:

1. An apparatus for measuring a surface of a workpiece, the apparatus comprising:
   a multi-link articulated arm; and
   a roughness sensor carried by the multi-link articulated arm, the roughness sensor having a sensing element configured to be linearly displaceable relative to the multi-link articulated arm along an advance direction and to be elastically deflectable along a deflection direction,
   the multi-link articulated arm comprising:
   a coupling link configured to connect the multi-link articulated arm to a movable carrier of a coordinate measuring apparatus or of a robot;
   a first arm portion arranged relative to the coupling link and configured to be rotatable by a first drive about a first axis of rotation;
   a second arm portion configured to be rotatable by a second drive relative to the first arm portion about a second axis of rotation;
   a third arm portion configured to be rotatable by a third drive relative to the second arm portion about a third axis of rotation, the third arm portion having the roughness sensor fastened thereto,
   the second arm portion being arranged between the first arm portion and the third arm portion; and
   the deflection direction being arranged parallel to the third axis of rotation while the sensing element is displaced linearly relative to the multi-link articulated arm along the advance direction.

2. The apparatus according to claim 1, further comprising flexible printed circuits configured to transfer at least one of measurement signals, closed-loop control signals, and open-loop control signals between the first, second, and third arm portions of the multi-link articulated arm.

3. The apparatus according to claim 2, wherein the flexible printed circuits are provided with a metal layer on one side to provide electromagnetic compatibility.

* * * * *